US 6,527,262 B2

(12) United States Patent
Hagino et al.

(10) Patent No.: US 6,527,262 B2
(45) Date of Patent: Mar. 4, 2003

(54) FLUID-FILLED ACTIVE ELASTIC ENGINE MOUNT

(75) Inventors: Yoshihiko Hagino, Inuyama (JP); Katsuhiro Goto, Inuyama (JP); Tatsuya Suzuki, Kasugai (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 09/836,966

(22) Filed: Apr. 17, 2001

(65) Prior Publication Data

US 2001/0032919 A1 Oct. 25, 2001

(30) Foreign Application Priority Data

Apr. 19, 2000 (JP) ......................... 2000-118062

(51) Int. Cl.[7] .............................. F16F 9/00; F16F 15/00
(52) U.S. Cl. ............................ 267/140.14; 267/140.15
(58) Field of Search ................... 267/140.14, 140.15, 267/141, 141.3, 140.13

(56) References Cited

U.S. PATENT DOCUMENTS

| | | | |
|---|---|---|---|
| 4,693,455 A | | 9/1987 | Andra |
| 5,037,071 A | * | 8/1991 | Takano et al. ......... 267/140.14 |
| 5,769,402 A | * | 6/1998 | Ide et al. ............... 267/140.14 |
| 5,911,412 A | * | 6/1999 | Durand et al. ......... 267/140.13 |
| 5,992,833 A | * | 11/1999 | Tanahashi ............... 267/140.13 |
| 6,010,120 A | * | 1/2000 | Nagasawa ............... 267/140.12 |
| 6,082,718 A | * | 7/2000 | Yamada et al. ............. 180/300 |
| 6,186,485 B1 | * | 2/2001 | Kawazoe ................ 267/140.14 |
| 6,254,069 B1 | * | 7/2001 | Muramatsu et al. ........ 248/550 |
| 6,276,673 B1 | * | 8/2001 | Hibi et al. .............. 267/140.14 |
| 6,315,277 B1 | * | 11/2001 | Nagasawa ............... 267/140.14 |
| 6,325,364 B1 | * | 12/2001 | Muramatsu ............. 267/140.14 |
| 6,357,730 B1 | * | 3/2002 | Gugsch et al. ......... 267/140.15 |

FOREIGN PATENT DOCUMENTS

| | | |
|---|---|---|
| EP | 0945643 A2 | 9/1999 |
| JP | 9-49541 | 2/1997 |
| JP | 10-331908 | 12/1998 |
| JP | 11-247919 | 9/1999 |

* cited by examiner

*Primary Examiner*—Jack Lavinder
*Assistant Examiner*—Robert A. Siconolfi
(74) *Attorney, Agent, or Firm*—Beyer Weaver & Thomas, LLP

(57) ABSTRACT

A fluid-filled elastic engine mount including an elastic body elastically connecting two mutually spaced-apart first and second mounting members and partially defining a pressure-receiving chamber filled with a non-compressible fluid, a flexible diaphragm partially defining an equilibrium chamber whose volume is variable, a movable oscillating plate partially defining the pressure-receiving chamber, an oscillating device for oscillating the movable oscillating plate for controlling pressure of the fluid in the pressure-receiving chamber, a first and a second orifice passage for effecting fluid communication between the pressure-receiving and equilibrium chambers. The first and second orifice passages are tuned to a low frequency band corresponding to an engine shake vibration and a medium-frequency range corresponding to an engine idling vibration, while the first and second orifice passages are disposed parallel to each other. The elastic engine mount further comprises a deformable elastic plate disposed in one of opposite opening of the second orifice passage located on the side of the pressure-receiving chamber, so that the deformable elastic plate closes the opening of the second orifice passage on the side of the pressure-receiving chamber.

8 Claims, 8 Drawing Sheets

FLUID-FILLED ACTIVE ELASTIC ENGINE MOUNT

INCORPORATION BY REFERENCE

The disclosure of Japanese Patent Application No. 2000-118062 filed on Apr. 19, 2000 is incorporated herein by reference in its entirety.

BACKGROUND OF THE INVENTION

1. Field of the Invention

The present invention relates generally to a fluid-filled active elastic engine mount including a fluid-filled pressure-receiving chamber, wherein a pressure of the fluid in the pressure-receiving chamber is suitably controlled so that the engine mount exhibits an active or positive vibration damping or isolating effects. More particularly, the present invention is concerned with such a fluid-filled active elastic engine mount which is novel in construction and which is capable of exhibiting an excellent active damping or isolating effect with respect to any vibrations including low frequency vibrations such as engine shakes, medium frequency vibrations such as engine idling vibrations, and high frequency vibrations such as booming noises.

2. Description of the Related Art

In an automotive vehicle having a power unit including an internal combustion engine, there has been used an elastic engine mount which is interposed between the power unit and a body of the vehicle for elastically mounting the power unit on the vehicle body in a vibration damping fashion, thereby attenuating or reducing vibrations transmitted from the power unit to the vehicle body. To cope with recent increasing demands for vibration damping characteristics of the engine mount, there has been developed an active engine mount which includes a first and a second mounting members, an elastic body elastically connecting the first and second mounting members and partially defining a fluid-filled pressure receiving chamber to which vibrations to be damped is applied, and an oscillating plate partially defining the pressure receiving chamber. The oscillating plate is oscillated at a frequency and amplitude which correspond to those of vibrations to be damped, and the oscillating movement of the oscillating plate may acts to offset or absorb periodic fluid pressure change in the primary fluid chamber due to elastic deformation of the elastic body upon application of the input vibrations. Thus, the active elastic mount exhibits an active or positive vibration damping effect based on the oscillation of the oscillating plate.

Generally, an engine mount is required to exhibit high vibration damping or isolating effects with respect to various kinds of input vibrations having different frequencies bands or ranging over a wide frequency band.

A known example of a modified engine mount proposed in an attempt to meet such a high requirement for the engine mount, is disclosed in Japanese Laid-Open Publication No. JP-A-10-331908. The disclosed engine mount includes a partition member which divides the pressure receiving chamber into a primary fluid chamber partially defined by the elastic body and an auxiliary fluid chamber partially defined by the oscillating plate, which are located on the opposite sides of the partition member. The primary fluid chamber is held in fluid communication with the equilibrium chamber through a first orifice passage, and is also held in fluid communication with the auxiliary fluid chamber through a second orifice passage. The first and second orifice passage are tuned to a low frequency band corresponding to engine shakes and a medium frequency band corresponding to engine idling vibrations, respectively. The disclosed engine mount constructed as described above is capable of exhibiting excellent vibration damping effects with respect to both of the engine shakes and the engine idling vibrations based on flows of the fluid through the first and second orifice passages, and is also capable of exhibiting active damping effects based on a periodic fluid pressure change generated in the auxiliary fluid chamber by the oscillation of the oscillating plate and transmitted to the pressure receiving chamber through the second orifice passage.

However, the proposed engine mount suffers from a problem of deterioration of the active damping characteristics thereof, upon application of vibrations whose frequency is higher than the medium frequency to which the second orifice passage is tuned. Namely, the engine mount is incapable of transmitting the periodic fluid pressure from the auxiliary fluid chamber to the primary fluid chamber through the second orifice passage, upon application of the higher frequency vibrations, since substantially no flow of the fluid through the second orifice passage is permitted due to a significant increase of resistance to the fluid flows through the second orifice passage. Therefore, the proposed engine mount having the first and second orifice passages tuned to engine shakes and engine idling vibrations, respectively, suffers from a significant deterioration of its vibration damping characteristics with respect to high frequency vibrations such as booming noises whose frequency is higher than the frequency of the engine idling vibration.

To cope with this drawback of the proposed engine mount, another modified engine mount has been proposed, wherein the first and second orifice passages are formed parallel to each other between the pressure receiving chamber and the equilibrium chamber, and the oscillating plate is disposed in a portion which is independent of or isolated from the first and second orifice passages, so that the oscillating plate is directly faced to the pressure receiving chamber. As a result of an extensive study of the thus constructed engine mount by the present inventors, it was found that the engine mount is prone to suffer from a significant deterioration of the vibration damping characteristics thereof due to a significant increase in a dynamic spring constant thereof upon application of vibration in a high frequency band. It seems that the engine mount has a resonance frequency in a higher frequency band that is higher than the medium frequency band corresponding to the engine idling vibrations.

While the reasons why the engine mount exhibits the significantly increased dynamic spring constant in the frequency band higher than the frequency band to which the second orifice passage is tuned, has not yet been revealed, it may be considered that the oscillating plate and an elastic support member elastically supporting the oscillating plate with respect to the second mounting member cooperate to constitute a mass-spring system, and the resonance of this mass-spring system may cause the above-indicated significant increase of the dynamic spring constant of the engine mount. In this respect, the engine mount is prone to suffer from the increase in the dynamic spring constant thereof upon application of vibrations having frequencies ranging from a few dozen to a few hundred Hz, corresponding to the booming noise, especially, ranging from 50 to 100Hz.

SUMMARY OF THE INVENTION

It is therefore an object of this invention to provide a fluid-filled active elastic engine mount which is capable of exhibiting an excellent vibration damping or isolating effect with respect to vibrations over a wide frequency range, especially to low frequency vibrations such as engine shakes, medium frequency vibrations such as engine idling vibrations, and high frequency vibrations such as booming noises.

The above object may be achieved according to the principle of the present invention, which provides a fluid-filled elastic engine mount comprising: a first and a second mounting member which are spaced apart from each other; an elastic body elastically connecting the first and second mounting members and partially defining a pressure-receiving chamber filled with a non-compressible fluid; a flexible diaphragm partially defining an equilibrium chamber filled with the non-compressible fluid, the flexible diaphragm being displaceable to permit a change in a volume of the equilibrium chamber; a movable oscillating plate partially defining the pressure-receiving chamber, the movable oscillating plate being oscillated by means of an oscillating device, for controlling pressure of the fluid in the pressure-receiving chamber; a first and a second orifice passage for effecting fluid communication between the pressure-receiving and equilibrium chambers, the first orifice passage being tuned to a low frequency band corresponding to an engine shake, while the second orifice passage being tuned to a medium-frequency range corresponding to an engine idling vibration, the first and second orifice passages being formed independently of the movable oscillating plate and being disposed parallel to each other; and a deformable elastic plate being disposed in one of opposite opening of the second orifice passage on the side of the pressure-receiving chamber, so that the deformable elastic plate closes the opening of the second orifice passage on the side of the pressure-receiving chamber.

The fluid-filled active engine mount constructed according to the present invention exhibits an excellent vibration damping effect with respect to the input engine shakes, owing to the resonance of the fluid flowing through the first orifice passage, while exhibiting an excellent vibration isolating effect with respect to the input engine idling vibrations, owing to the resonance of the fluid flowing through the second orifice passage. Further, the fluid-filled active engine mount constructed according to the present invention also exhibits an excellent vibration isolating effect with respect to the input booming noises, owing to the oscillation of the oscillating plate so as to control the fluid pressure in the pressure-receiving chamber.

In the present fluid-filled active elastic engine mount, the first and second mounting member may be substantially closed, that is, may be malfunctioned, upon application of vibrations within a frequency band which is higher than the frequency bands to which the first and second orifice passages are tuned. However, the oscillating plate is directly faced to the pressure receiving chamber, via no orifice passage, the fluid pressure in the pressure-receiving chamber can directly be adjusted and controlled based on the oscillation of the oscillating plate. Thus, the present engine mount can exhibit an excellent vibration isolating effect with respect to high frequency vibrations without suffering from adverse effects of the substantially closed first and second orifice passages. While the present engine mount exhibits passive vibration damping or isolating effect with respect to the engine shakes and the engine idling vibrations, owing to the resonance of the fluid flowing through the first and second orifice passages, the engine mount is also capable of exhibiting active vibration isolating effect with respect especially to engine idling vibrations, by suitably controlling the phase and frequency of the oscillation of the oscillating plate.

Further, the present engine mount includes the deformable elastic plate which closes the opening of the second orifice passage on the side of the pressure-receiving chamber. The deformable elastic plate is elastically deformed based on a difference between the fluid pressure in the pressure receiving chamber and the fluid pressure in the equilibrium chamber, which act on the opposite sides of the deformable elastic plate, thereby permitting a substantial flow of the fluid through the second orifice passage between the pressure-receiving and equilibrium chambers. The provision of the deformable elastic plate is effective to prevent or minimize a significant increase of the dynamic spring constant of the engine mount upon application of the vibrations within a frequency band higher than the frequency to which the second orifice passage is tuned. That is, the present invention was made based on this finding.

In the conventional engine mount suffers from a significant increase of the dynamic spring constant thereof, upon application of the high frequency vibrations higher than the tuning frequency of the second orifice passage, which may be considered to be caused by the resonance of the mass-spring system constituted by the oscillating plate. However, the present fluid-filled active elastic engine mount is capable of avoiding or minimizing the significant increase of the dynamic spring constant thereof with respect to high frequency vibrations, owing to the presence of the deformable elastic plate, resulting in minimizing a vibration transmittal rate of the engine mount. Accordingly, the present engine mount is capable of exhibiting a high vibration isolating effect with respect to the high frequency vibrations such as booming noises, by suitably controlling the fluid pressure in the pressure receiving fluid caused by the oscillation of the oscillating plate, while maintaining a high vibration damping and isolating effect with respect to the low- and medium-frequency vibrations corresponding to the engine shakes and the engine idling vibrations.

While the reason why the provision of the deformable elastic plate is effective to prevent or minimize the increase of the dynamic spring constant of the engine mount have not yet sufficiently revealed, it may be considered that the elastic deformation of the deformable elastic plate generates a change of the phase of the periodic fluid pressure change in the pressure receiving chamber, and this phase change may cause the prevention or minimization of the increase of the dynamic spring constant.

According to a first preferred form of the present invention, the engine mount further comprises a control device adapted to control the oscillating plate to be oscillated at a frequency corresponding to that of vibration to be damped. With the control device previously assembled in the engine mount, the engine mount can exhibit its active damping effect with high stability. The control device may preferably adapted to control the oscillation of the oscillating plate in terms of frequency, phase, amplitude and the like, in a feed-back control fashion or according to a stored data map, based primarily on a reference signal having a high degree of correlation with the vibration of the power unit of the vehicle, such as an ignition timing signal generated by an ignition pulse sensor or a cranking angle sensor which is mounted on the internal combustion engine, and further based on a signal indicative of the vehicle running speed, a signal indicative of the engine speed, a signal indicative of amount of acceleration, which signals may be detected from various kinds of sensor.

The oscillating device may preferably be constituted by an electromagnetic actuator including a voice-coil type, a moving magnet type and a solenoid type, such as an electrostrictive element, or a magnetostrictive element, in the light of a high response and a good control performance. Alternatively, the oscillating device may preferably be constituted by a pneumatically operated actuator which is arranged to utilize a negative pressure available from an air intake system in the internal combustion engine, in the light of its energy efficiency. Preferably, the pneumatically operated actuator includes a solenoid operated switch valve or the like which is operable to alternatively connect and disconnect an working air chamber formed in the engine mount to and from the negative pressure and the atmosphere. In this case, the working air chamber may be partially defined by one of opposite surface of the oscillating plate remote from the pressure-receiving chamber, so that a periodic change of the air pressure generated in the working air chamber is directly acts on the oscillating plate.

According to a second preferred form of the present invention, the fluid-filled active elastic engine mount further comprising a displacement restricting means for restricting an amount of displacement of the flexible diaphragm and/or the oscillating plate. This arrangement leads to improved stability of the flexible diaphragm and the oscillating plate. The displacement restricting means may be constituted by a rigid stop member formed in the partition member or the like such that the stop member is opposed to the flexible diaphragm or the oscillating member with a spacing therebetween in the direction in which the flexible diaphragm or the oscillating member is displaced.

According to a third preferred form of the present invention, the second mounting member is a hollow cylindrical member, one of axially opposite open ends of the second mounting member being opposed to the first mounting member with a spacing therebetween and is fluid-tightly closed by the elastic body elastically connecting the first and second mounting member, the engine mount further comprising a partition member fixedly accommodated within the second mounting member such that the partition member extends in a radial direction perpendicular to an axial direction thereof, and such that the pressure receiving chamber partially defined by the elastic body is located on one of axially opposite sides of the partition member and the equilibrium chamber partially defined by the flexible diaphragm is located on the other side of the partition member, the partition member including a through hole formed through a center portion thereof for accommodating therein the movable oscillating plate partially defining the pressure-receiving chamber, and the first and second orifice passages formed in an outer circumferential portion thereof, the oscillating device being supported by the second mounting member on the side of the other open end portion of the second mounting member which is remote from the first mounting member.

In the third preferred form of the invention, the oscillating plate is disposed in the central portion of the partition member, facilitating assembly of the oscillating device for driving the oscillating plate within the interior space of the engine mount, leading to improved manufacture efficiency of the engine mount. Further, the first and second orifice passage are both formed in the outer circumferential portion of the partition member, making it possible to provide a sufficiently large acceptable range in a configuration and a length of the first and second orifice passages, resulting in an increased freedom in tuning of the first and second orifice passages.

It is to be understood that each element, component, or technical features of the aforementioned forms of the present invention may be employed at any possible combinations for practicing the principle of the present invention. The features of the present invention are not limited to the foregoing description, but may otherwise be recognized based on the thought of the present invention that disclosed in the whole specification and drawings or that may be recognized by those skilled in the art in the light of the disclosure in the whole specification and drawings.

BRIEF DESCRIPTION OF THE DRAWINGS

The above and other objects, features advantages and technical and industrial significance of the present invention will be better understood by reading the following detailed description of the presently preferred embodiment or mode of the invention when considered in conjunction with the accompanying drawings in which:

FIG. 6($a$) is a graph showing a relationship between the absolute spring constant of the engine mount of FIG. 1 and the frequency of vibrations applied to the engine mount, and FIG. 6($b$) is a graph showing frequency characteristics of an oscillating force measured in the engine mount of the present invention, together with those of an estimated vibrational force transmitting from a power unit and a body of an automotive vehicle, during driving of the vehicle;

FIG. 9($a$) is a graph showing a relationship between the absolute spring constant of the engine mount of the comparative example 1 of FIG. 8, and FIG. 9($b$) is a graph showing frequency characteristics of an oscillating force measured in the engine mount of the comparative example 1, together with those of an estimated vibrational force transmitted from the power unit to the body of the vehicle during the driving of the vehicle.

FIG. 11($a$) is a graph showing a relationship between the absolute spring constant of the engine mount of the comparative example 2 of FIG. 10, and FIG. 11($b$) is a graph showing frequency characteristics of an oscillating force measured in the engine mount of the comparative example 2, together with those of an estimated vibrational force transmitted from the power unit to the body of the vehicle during the driving of the vehicle.

DETAILED DESCRIPTION OF THE PREFERRED EMBODIMENT

Figure 1:
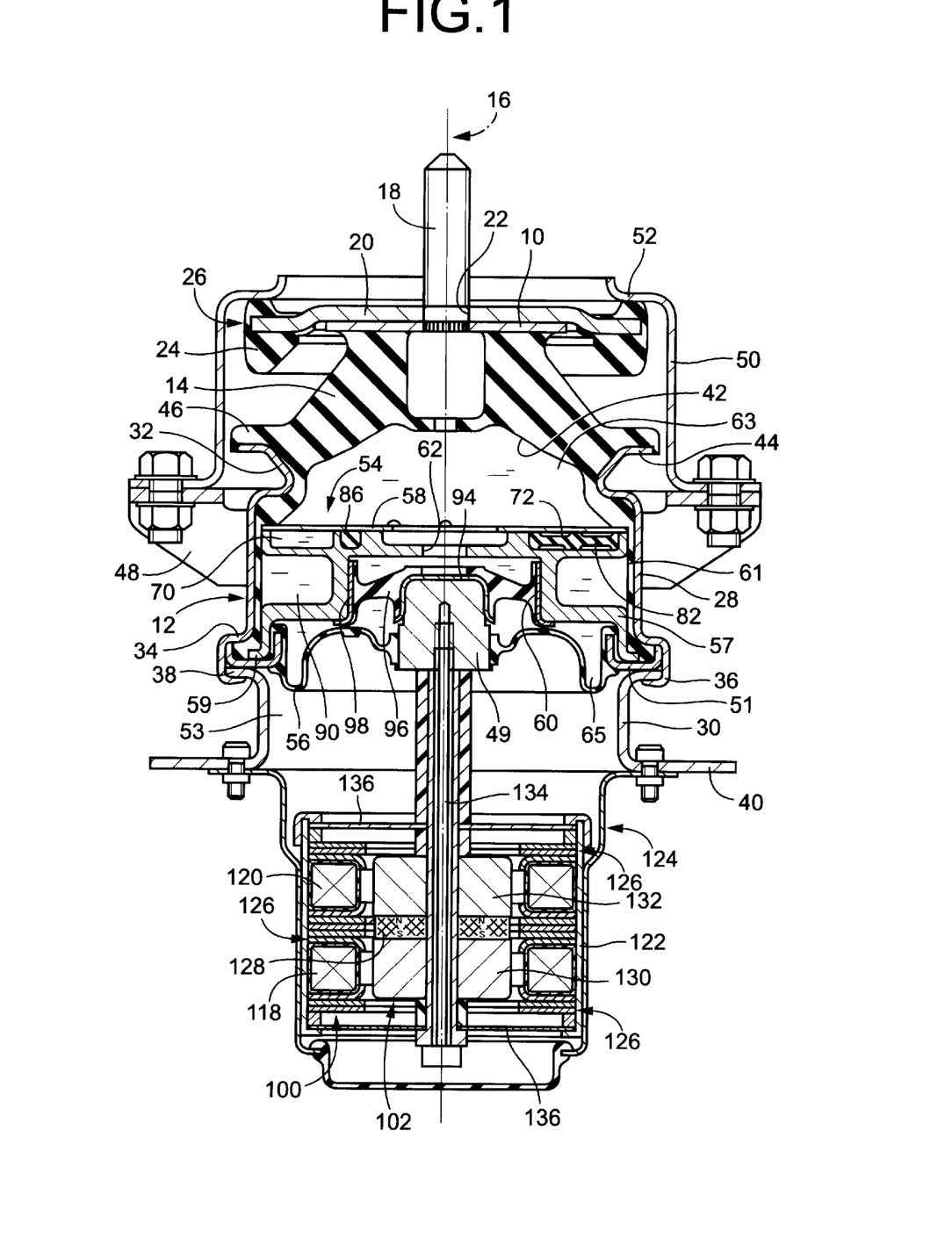
FIG. 1 is an elevational view in axial or vertical cross section of a fluid-filled active elastic engine mount for vehicles, which is constructed according to a first embodiment of the invention.

Referring first to FIG. 1, there is shown an engine mount for an automotive vehicle, which is constructed according to one embodiment of the present invention. This engine mount includes a first mounting member 10 and a second mounting member 12 which are both made of metallic materials and which are disposed in mutually opposed and spaced-apart relationship with each other. These first and second mounting members 10, 12 are elastically connected to each other by an elastic body 14 made of a rubber material. The first and second mounting members 10, 12 are attached to a power unit (not shown) and a body (not shown) of the vehicle, respectively, so that the power unit is mounted on the vehicle body via the present engine mount in a vibration damping fashion. When the present engine mount is installed in the vehicle as described above, a load or weight of the power unit acts on the elastic body 14 and the elastic body 14 is elastically deformed, whereby the first and second mounting members 10, 12 are displaced toward each other by a suitable relative distance in the axial direction of the engine mount, i.e., in the vertical direction as seen in FIG. 1, which is parallel to a center axis 16 of the engine mount. In this axial or vertical direction, a primary vibrational load is applied to the engine mount. In the following description, the words "upper" and "lower" or "upward" and "downward" will be used to represent vertically upper and lower positions or directions of the components or parts in the engine mount as seen in FIG. 1.

More specifically described, the first mounting member 10 is a generally circular disk-shaped member extending in a radial direction perpendicular to the center axis 16, and includes a center hole formed through a center portion thereof. A mounting bolt 18 extends through the center hole of the first mounting member 10 in the axially upward direction of the engine mount, and is press-fitted at its bottom portion into the central hole. A stopper plate 20 having a generally circular disk shape and including a center hole 22 formed through a center portion thereof is press fitted at its inner circumferential surface onto the mounting bolt 18. The stopper plate 20 is closely fitted onto the upper surface of the first mounting member 10 so as to extend in a radial direction perpendicular to the center axis 16 of the engine mount. In this condition, the outer circumferential portion of the stopper plate 20 protrudes radially outwardly from the outer periphery of the first mounting member 10. An annular rubber buffer 24 is secured to the outer circumferential portion of the stopper plate 20, to thereby provide a stopper 26. The first mounting member 10 and a stopper plate 20 placed on the first mounting member 10 are bolted to the power unit by the fixing bolt 18.

The second mounting member 12 consists of an upper sleeve 28 and a lower sleeve 30 which are both made of metallic materials and having a generally cylindrical shape. The upper sleeve 28 has a shoulder 34 at an axially lower portion thereof, and includes a small-diameter portion on the upper side of the shoulder 34 and a large-diameter portion on the lower side of the shoulder 34. The large-diameter portion serves as a calking part 36 having a cylindrical shape. The upper sleeve 28 further has a constricted part near and upper open end thereof, so that the upper open end of the upper sleeve 28 extends radially outwardly in the axially upward direction, thereby serving as a tapered connecting portion 32. The lower sleeve 30 has an axially upper and lower open-end portions thereof, which are both bent in a radially outward direction so as to form an upper flange 38 and a lower flange 40 as integral parts. The upper and lower sleeves 28, 30 are assembled with each other, such that the upper flange 38 of the lower sleeve 30 is calked to the calking part 36 of the upper sleeve 28, whereby there is provided the second mounting member 12 having a generally cylindrical shape. The thus formed second mounting member 12 is bolted at the lower flange 40 of the lower sleeve 30 to the body of the vehicle.

The first mounting member 10 is disposed with a suitable axial distance away from the upper open end of the second mounting member 12, and the elastic body 14 is interposed between and bonded to the first and second mounting members 10, 12, for elastically connecting the first and second mounting members 10, 12 with each other.

The elastic body 14 has a generally frusto-conical shape. In a vulcanization process of a rubber material for forming the elastic body 14, the small diameter portion of the elastic body 14 is bonded to the lower surface of the first mounting member 10, and the outer circumferential surface of the large diameter portion of the elastic body 14 is bonded to the tapered connecting portion 32 of the upper sleeve 28. That is, there is formed an integral vulcanized intermediate assembly consisting of the first mounting member 10, the upper sleeve 28 and the elastic body 14. The elastic body 14 has an inverted mortar-shaped recess 42 open in its large-diameter end face, so that it is effectively reduced or eliminated a tensile stress acting on the elastic body 14 upon application of a static load or weight of the power unit to the engine mount.

The upper sleeve 28 has an abutting part 44 integrally formed at the peripheral portion of the open end of the tapered connecting portion 32 thereof. The abutting part 44 extends radially outwardly from the open end of the tapered connecting portion 32, and is opposed to the stopper 26 with a given spacing therebetween in the direction parallel to the center axis 16 of the engine mount, i.e., in the primary load receiving direction. A rubber buffer 46 is secured to the axially upper surface of the abutting part 44. The stopper 26 and the abutting part 44 are brought into elastic abutting contact with each other through the rubber buffers 24, 46, for limiting an amount of relative displacement of the first and second mounting members toward each other, in the primary load receiving direction parallel to the center axis 16.

On the outer circumferential surface of the upper sleeve 28, there is fixed a bracket 48 such that an annular upper plate of the bracket 48 extends radially outwardly from the outer circumferential surface of the upper sleeve 28. The bracket 48 serves to support a stop cylinder 50 which is fixed to the annular upper plate of the bracket 48 and extends in the axially upward direction toward the first mounting member 10. The cylindrical wall portion of the stop cylinder 50 is disposed radially outwardly of the elastic body 14 with a spacing therebetween, and the axially upper end portion of the stop cylinder 50 is radially inwardly bent to form an abutting part 52 which is disposed axially upwardly of the stopper 26 so as to oppose to the stopper 26 in the axial direction. The stopper 26 and the abutting part 52 are brought into elastic abutting contact with each other through the rubber buffer 24, for limiting an amount of relative displacement of the first and second mounting members 10, 12 away from each other, in the primary load receiving direction parallel to the center axis 16.

With the elastic body 14 bonded to the first and second mounting members 10, 12 in the above-indicated vulcanization process, the axially upper opening of the second mounting member 14 is fluid tightly closed by the elastic body 14. Within the second mounting member 12, there are disposed a partition member 54 and a flexible diaphragm 56 so as to extend in the radial direction perpendicular to the center axis 16 of the engine mount.

The diaphragm 56 is a thin-walled flexible rubber layer which is easily deformable. The center part of the diaphragm 56 is bonded to a metallic connecting block 49 in a vulcanization process of a rubber material for forming the diaphragm 56, such that the connecting block 49 extend through the central part of the diaphragm 56. The peripheral portion of the diaphragm 56 is bonded to a generally annular metallic fixing sleeve 51 in the above-indicated vulcanization process. The diaphragm 56 has a slack in the radial direction so as to facilitate its deformation.

The fixing sleeve 51 is fluid-tightly calked with respect to the second mounting member 14 such that the radially outer portion of the fixing sleeve 51 is gripped by and between the shoulder 34 of the upper sleeve 28 and the upper flange 38 of the lower sleeve 30. That is, the diaphragm 56 is supported at its peripheral portion by the second mounting member 12 such that the axially lower openings of the upper sleeve 28 of the second mounting member 12 is fluid-tightly closed by the diaphragm 56. The upper sleeve 28, the elastic body 14 and the diaphragm 56 cooperate to define a fluid chamber fluid-tightly enclosed within the upper sleeve 28 and filled with a suitable non-compressible fluid such as water, alkylene glycol, polyalkylene glycol, or silicone oil. For effective damping of input vibrations based on resonance of the fluid, it is preferable to fill the fluid chamber with a low-viscosity fluid whose viscosity is not higher than 0.1 Pa·s. On the axially lower side of the diaphragm 56, there is provided an air chamber 53 formed within the lower sleeve 30, thereby permitting a deformation of the diaphragm 56.

The partition member 54 includes a partition plate 57 and a covering member 58 which are both made of rigid materials such as metallic materials including aluminum alloy and a synthetic resin material. The partition plate 57 has a thick-walled circular disk shape, while the covering member 58 has a thin-walled circular disk shape. The covering member 58 is superposed on and closely fixed to the upper surface of the partition plate 57. The thus constructed partition member 54 is press-fitted into the upper sleeve 28, such that the peripheral portion of the covering member 58 is forcedly pressed onto the tapered connecting portion 32 via the elastic body 14. The partition plate 57 has an annular radial projection 59 integrally formed at its axially lower end portion so as to protrude radially outwardly. The radial projection 59 is calked with respect to the second mounting member 14 such that the radial projection 59 is gripped by and between the shoulder 34 of the upper sleeve 28 and the upper flange 38 of the lower sleeve 30, together with the fixing sleeve 51. Thus, the partition member 54 is fixedly assembled within the second mounting member 12. In this respect, a sealing rubber layer 61 is bonded by vulcanization to the substantially entire area of the inner circumferential surface of the upper sleeve 28, and compressed by and between the outer circumferential surface of the partition member 54 and the inner circumferential surface of the upper sleeve 28, thereby assuring fluid-tight sealing between the partition member 54 and the upper sleeve 28.

Therefore, the fluid chamber enclosed within the upper sleeve 28 is divided by the partition member 54 into two fluid-filled sections, namely a pressure-receiving chamber 63 partially defined by the elastic body 14 and located on the axially upper side of the partition member 54 and an equilibrium chamber 65 partially defined by the diaphragm 56 and located on the axially lower side of the partition member 57. The pressure of the fluid in the pressure-receiving chamber 63 is changed due to the elastic deformation of the elastic body 14 upon application of a vibrational load to the engine mount, while the volume of the equilibrium chamber 65 is easily varied due to the deformation of the flexible diaphragm 56.

The partition plate 57 has a central recess 60 open in the axially lower surface thereof. As is apparent from FIGS. 2–3, the bottom wall portion of the central recess 60 is formed with a plurality of through hole 62, so that the axially opposite sides of the bottom wall of the central recess 60 are held in fluid communication through the through holes 62. That is, the central recess 60 and the plurality of through holes 62 formed through the bottom wall of the center recess 60 cooperate to each other to form the communication hole.

Figure 2:
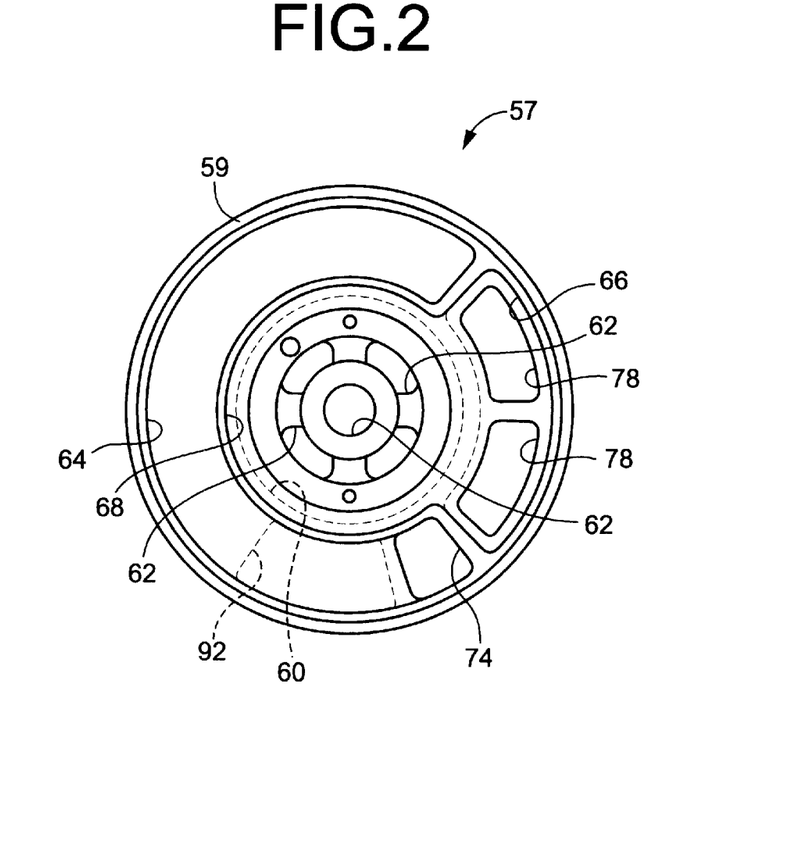
FIG. 2 is a top plane view of a partition member used in the engine mount of FIG. 1.
Figure 3:
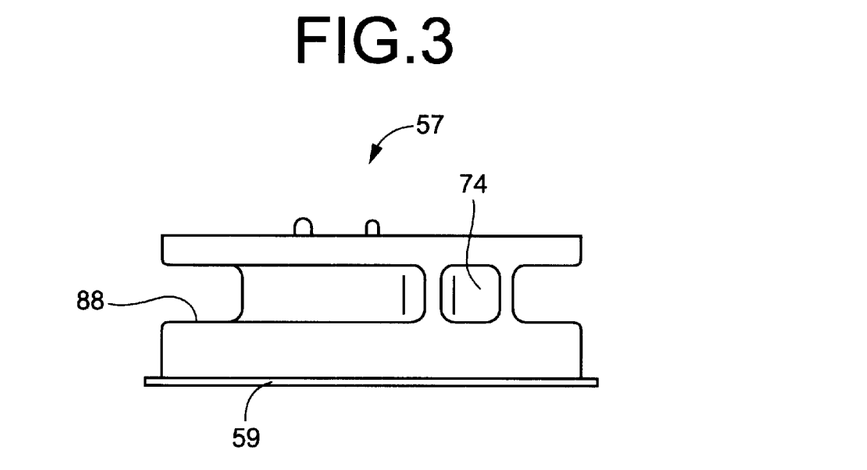
FIG. 3 is an elevational view of the partition member of FIG. 2.

The partition plate 57 also has an upper circumferential groove 64, an oscillating plate accommodation recess 66, and an annular recess 68, which are all open in the upper surface of the partition plate 57. The upper circumferential groove 64 is formed at an outer circumferential portion of the partition plate 57 so as to extend in the circumferential direction with a circumferential length which is smaller than the circumference of the partition plate 57, e.g., a circumferential length of about three-fourths (¾) of the circumference of the partition plate 57. The accommodation recess 66 is also formed at the outer circumferential portion of the partition plate 57 so as to extend in the circumferential direction between the circumferentially opposite ends of the upper circumferential groove 64, with a circumferential length which is smaller than the circumference of the partition plate 57, e.g., a circumferential length of about one-fourth (¼) of the circumference of the partition plate 57. The annular recess 68 is formed at radially intermediate portion of the partition plate 57, which is located radially inwardly of the upper circumferential groove 64 and the oscillating plate accommodation recess 66. The annular recess 68 extends continuously in its circumferential direction and integrally connects with the oscillating plate accommodation recess 66.

Figure 4:
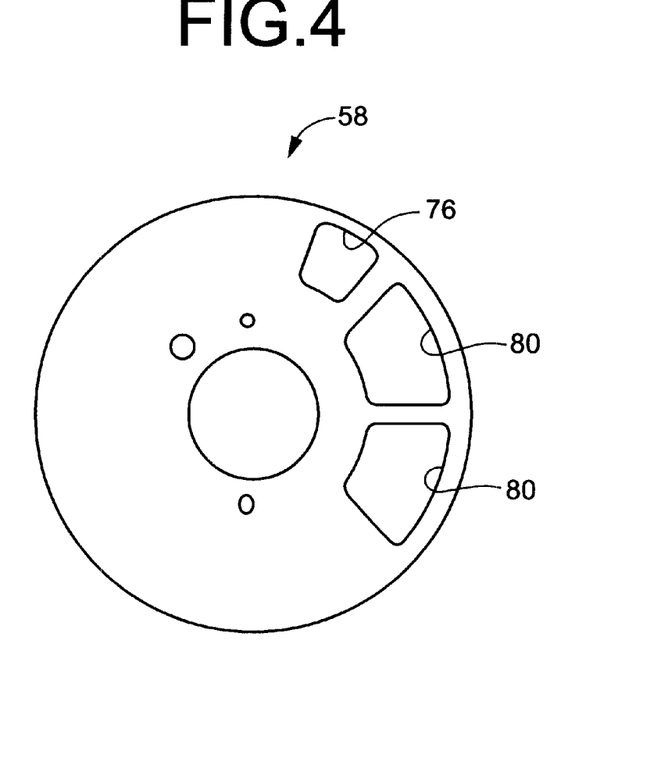
FIG. 4. is a top plane view of a covering member used in the engine mount of FIG. 1.

The covering member 58 as shown in FIG. 4 is closely superposed on the upper surface of the partition plate 57, whereby the openings of the upper circumferential groove 64, the oscillating plate accommodation recess 66 and the annular recess 68 are all fluid-tightly closed by the covering member 58, to thereby form a first orifice passage 70 extending circumferentially with a circumferential length of about three-fourths (¾) of the circumference of the partition plate 57, and an oscillating plate accommodation space 72 extending circumferentially with a circumferential length of about one-fourth (¼) of the circumference of the partition plate 57. Namely, the first orifice passage 70 and the accommodation space 72 are formed independently of each other. One of opposite end of the first orifice passage 70 is held in fluid communication with the equilibrium chamber 65 through a communication hole 74 formed through the partition plate 74 in the axial direction, while the other end of the first orifice passage 70 is held in fluid communication with the pressure-receiving chamber through a communication hole 76 formed through the covering member 58.

Figure 5:
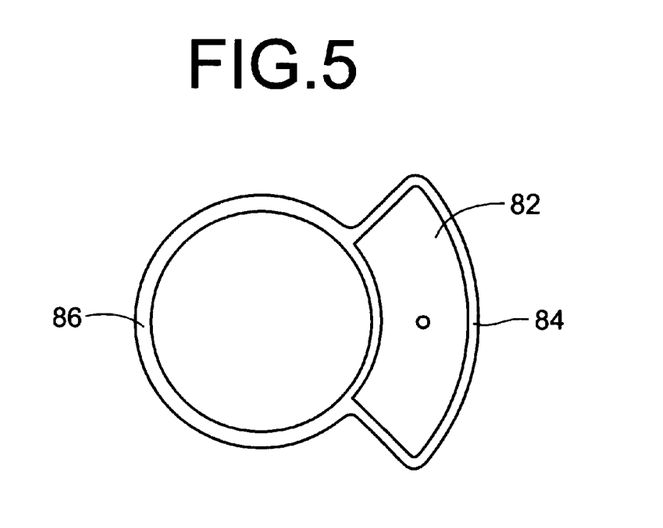
FIG. 5 is a top plane view of a flexible rubber plate used in the engine mount of FIG. 1.

Within the oscillating plate accommodation space 72, there is accommodated a flexible rubber plate 82 as a deformable elastic plate. As shown in FIG. 5, the rubber plate 82 is a generally flat plate member whose configuration corresponds to that of the accommodation recess 66, and whose wall thickness is made slightly smaller than the depth of the accommodation recess 66. This rubber plate 82 has a thick-walled fixing portion 84 which is integrally formed along the outer peripheral portion of the rubber plate 82. With the fixing portion 84 gripped by and compressed between the bottom surface of the accommodation recess 66 and the covering member 58, the rubber plate 82 is fixedly disposed within the accommodation space so as to extend parallel to the bottom surface of the accommodation recess 66 and the covering member 58. Thus, the accommodation space 72 is fluid-tightly divided into two sections located on the opposite sides of the rubber plate 82. In this respect, the rubber plate 82 has a pair of rubber projections as a deformation-restricting member integrally formed at central portions of the opposite measure surfaces thereof. These rubber projections are brought into abutting contact with the covering member 58 and the bottom surface of the accommodation recess 66, respectively, for limiting an amount of elastic deformation of the rubber plate 82.

One of two sections of the accommodation space 72, which is located on the axially lower side of the rubber plate 82, is open to the interior space of an outer circumferential groove 88 (which will be described later) through a window 78 formed through the partition plate 57. That is, the axially lower surface of the rubber plate 82 is substantially open to the outer circumferential groove 88 through the window 78. The other section of the accommodation space 72 which is located on the axially upper side of the rubber plate 82 is open to the pressure receiving chamber 63 through the window 80 formed through the covering member 58. That is, the axially upper surface of the rubber plate 82 is substantially open to pressure receiving chamber through the window 80.

As is apparent from FIG. 5, the rubber plate 82 has an annular sealing ring 86 integrally formed at its inner circumferential portion so as to extend in the opposite circumferential directions. The sealing ring 86 is disposed radially inward of the first orifice passage 70 over the entire circumferential length of the first orifice 70, and fluid-tightly compressed by and between the upper end face of the partition plate 57 and the covering member 58, assuring fluid-tight sealing of the first orifice passage 70.

The partition plate 57 further has the above-mentioned outer circumferential groove 88 formed in its axially intermediate and radially outer portion, which groove 88 extends in the circumferential direction of the partition plate 57 with a circumferential length which is slightly smaller than the circumference of the partition plate 57, and which groove 88 is open in the outer circumferential surface of the partition plate 57. The outer circumferential groove 88 is spaced apart or independent of the communication hole 74 formed through the partition plate 57. With the partition plate 57 being press-fitted into the upper sleeve 28 of the second mounting member 12, as shown in FIG. 1, the opening of the outer circumferential groove 88 is fluid-tightly closed by the upper sleeve 28, to thereby form a second orifice passage 90. One of opposite end of the second orifice passage 90 is held in fluid communication with the equilibrium chamber through a communication bore 92 formed through the partition plate 57 in the axially downward direction and open in the axially lower surface of the partition plate 57, while the other end of the second orifice passage 90 is held in fluid communication with the oscillating plate accommodation space 72 through the window 78.

The center recess 60 of the partition plate 57 functions to accommodate a movable oscillating plate in the form of an oscillating metal member 94. The oscillating metal member 94 is an inverted cup shaped member having a bottom wall portion whose diameter is smaller than the inner diameter of the center recess 60. The oscillating metal member 94 is elastically connected to a cylindrical fixing sleeve 98 disposed radially outward thereof by an annular disk shaped oscillating rubber support 96 interposed therebetween. The oscillating rubber support 96 is bonded at its inner circumferential surface to the outer circumferential surface of the oscillating metal member 94 and at its outer circumferential surface to the inner circumferential surface of the cylindrical fixing sleeve 98, upon vulcanization of a rubber material for forming the oscillating rubber support 96. That is, the oscillating rubber support 96 cooperates with the oscillating metal member 94 and the fixing sleeve 98 to provide an integral vulcanized assembly in which the oscillating metal member 94 and the fixing sleeve 98 are held in a substantially concentric or coaxial relationship with each other. The fixing sleeve 98 of the thus formed integral vulcanized assembly is press-fitted into the center recess 60 of the partition plate 57, so that the oscillating metal member 94 is elastically supported by the partition member 54 such that the center recess 60 is fluid-tightly divided by the oscillating metal member 94 and the oscillating rubber support 96 each extending in a direction perpendicular to the axial direction of the center recess 60. The oscillating metal member 94 is forcedly pressed onto the axially upper portion of the connecting block 49 to which the center portion of the diaphragm is bonded.

With the above-indicated intermediate vulcanized assembly 94, 96, 98 being assembled with respect to the partition plate 57, the upper surfaces of the oscillating metal member 94 and the oscillating rubber support 96 are directly open to the pressure receiving chamber 63 via the center recess 60 and the plurality of through holes 62, while the lower surfaces of the oscillating metal member 94 and the oscillating rubber support 96 directly partially defining the equilibrium chamber 65. That is, the oscillating metal member 94 and the oscillating rubber support 96 cooperate to each other to fluid-tightly separate the pressure receiving chamber 63 and the equilibrium chamber 65 from each other.

Below the lower sleeve 30 of the second mounting member 12, there is disposed an electromagnetic oscillating device as an oscillating device, which is bolted to the lower flange 40 of the lower sleeve 30. In the present embodiment, one kind of electromagnetic actuator or oscillating device as disclosed in a Japanese unexamined Patent application No. JP-A-11-257414 may be employed, for example, as the oscillating device, for example. The electromagnetic oscillating device includes an air-core coil member 100, a magnet member 102 which is disposed in an air-core portion of the coil member 100 such that the magnet member 102 is movable relative to the coil member in an axial direction thereof. Upon application of an electric current to the coil member 100, an electromagnetic force is produced between the coil member 100 and the magnet member 102 so that an oscillating force is applied to the oscillating metal member 94 in the axial direction (i.e., the vertical direction as seen in FIG. 1) via a fixing bolt 134 (which will be described later) and the connecting block 49.

Described more specifically, the coil member 100 includes the first coil 118 and a second coil 120 which are coaxially aligned with each other, and a plurality of thin-annular plates 126 each formed of a ferromagnetic material. The plurality of thin-annular plates 98 are interposed between the first and second coils 118, 120, and are disposed on an upper end face of the second coil 120 and an lower end face of the first coil 118, whereby the substantially single air-core coil member 100 is provided. The lamination consisting of the first and second coils 118, 120 and the plurality of annular plate 126 is accommodated within a cylindrical case 122 such that the lamination is fitted into and bonded to an inner circumferential surface of the cylindrical case 122. The case 122 is press-fitted into a bore of a cylindrical coil housing 124 which is bolted to the lower flange 40 of the lower sleeve 30 of the second mounting member 12, whereby the coil member 100 is fixed to the lower sleeve 30, i.e., the second mounting member 12.

The magnet member 102 includes an annular plate-like permanent magnet 128, and annular upper and lower blocks 132,130 each formed of a ferromagnetic material are located on the axially opposite sides of the permanent magnet 128, such that the permanent magnet 128 is sandwiched by and between the upper and lower blocks 132, 130. The fixing bolt 134 extends through respective central holes formed through the permanent magnet 128, and the upper and lower blocks 132, 130 such that the permanent magnet 128 and the upper and lower blocks 132, 130 are press-fitted onto the outer circumferential surface of the fixing bolt 134. The permanent magnet 128 has two magnetic poles at the axially opposite ends thereof, so that the magnet member 102 in its entirely has two magnetic poles at its axially opposite ends. The magnet member 102, i.e., an unit including the annular magnet 128 and the upper and lower blocks 132, 130, has an outer diameter which is smaller than an inner diameter of the air-core portion of the coil member 100, and an axial length smaller than that of the air-core portion. The thus formed magnet member 102 is substantially coaxially disposed within the air-core portion. Further, a pair of annular disk-shaped leaf springs 136, 136 are press-fitted onto the fixing bolt 134 such that the leaf springs 136, 136 are located on axially opposite sides of the magnet member 102, with a given axial spacing therebetween. The pair of leaf springs 136, 136 are secured at their outer peripheral portion to the axially upper and lower end portions of the cylindrical case 122, respectively. In this arrangement, the pair of springs 136, 136 cooperate to each other to position the magnetic member 102 relative to the coil member 100, and the elastic deformation of the leaf springs 136, 136 permits an axial displacement of the magnet member 102 relative to the housing member.

The fixing bolt 134 which extends through the central portion of the magnetic member 102, further extends axially upwardly so as to be threaded into the connecting block 49 which extends through the central portion of the diaphragm 56 and which is fixed to the oscillating metal member 94. In the electromagnetic oscillating device constructed as described above, an electric current is applied to the coils 118, 120 of the coil member 100 located in a magnetic field of the magnet member 102, so that a Lorentz's force is exerted to the electric current flowing through the coils 118, 120 located in the magnetic fields of the magnetic member 102, resulting in that a drive force is generated which moves the magnetic member 102 relative to the coil member 100, in the axial direction of the fixing bolt 134. This drive force is applied to the oscillating metal member 94 via the fixing bolt 134 and the connecting block 49, so that the oscillating metal member 94 is displaced in the axially upward and downward directions, based on the elastic deformation of the leaf springs 136, 136. When an alternative current having a frequency corresponding to that of a vibration to be damped, is applied to the coils 118, 120, the oscillating metal member 94 is oscillated at a frequency corresponding to that of the vibration to be damped, causing a periodic change of a pressure of the fluid in the pressure receiving chamber 63 partially defined by the oscillating metal member 94, at the frequency corresponding to that of vibration to be damped, thereby generating an oscillating force having the frequency corresponding to that of vibration to be damped. The oscillating force is applied to the body of the vehicle to offset the vibration to be damped, resulting in an excellent active damping effect of the engine mount. Alternatively, the periodic change of the pressure of the fluid in the pressure-receiving chamber 63 actively induces flows of the fluid through the first and second orifice passages 70, 90, resulting in a high damping effect of the engine mount owing to resonance of the fluid flowing through the first and second orifice passages.

With the engine mount constructed as described above installed in position, a vibrational load to be damped is applied between the first and second mounting members 10, 12 primarily in an axial direction of the mount which corresponds to the vertical direction as viewed in FIG. 1. Upon application of the vibrational load between the first and second mounting members 10, 12, a pressure of the fluid in the pressure receiving chamber 63 changes due to the elastic deformation of the elastic body 14. This pressure change of the fluid in the pressure receiving chamber 63 induces a fluid pressure difference between the pressure receiving chamber 63 and the equilibrium chamber 65, so that the fluid is forced to flow through the first and second orifice passage 70, 90 between the pressure receiving and equilibrium chambers 63, 65. Accordingly, the engine mount exhibits an excellent vibration damping or isolating effect based on the resonance of the fluid flowing through the first and second orifice passages 70, 90 with respect to input vibrations having specific frequencies to which the first and second orifice passage 70, 90 are respectively tuned. In the present embodiment, the first orifice passage 70 is tuned so as to exhibit a high damping effect with respect to low-frequency vibrations such as engine shakes, on the basis of the resonance of the fluid flowing therethrough, while the second orifice passage 90 is tuned so as to exhibit a low dynamic spring constant and accordingly a high vibration isolating effect with respect to medium-frequency vibrations, such as engine idling vibrations, based on the resonance of the fluid flowing therethrough.

The tuning of the first and second orifice passages 70, 90 may be advantageously effected by adjusting the length: L and the cross sectional area: A (a ratio A/L) of each orifice so as to permit the engine mount to exhibit a desired damping or isolating effect with respect to the intended frequency vibrations to be damped, based on resonance of the fluid flowing through the first and second orifice passages 70, 90, while taking account of the spring stiffness of the wall of the elastic body 14 which partially defines the pressure-receiving chamber and the spring stiffness of the wall of the diaphragm 56 which partially defines the equilibrium chamber 65. While the second orifice passage 90 tuned to the medium frequency band has a smaller resistance to the fluid flows therethrough than the first orifice passage 70 tuned to the low frequency band, an amount of flows of the fluid through the second orifice passage 90 is restricted by the rubber plate 82, thereby assuring a sufficient amount of flows of the fluid through the first orifice passage 70 upon application of the low frequency vibrations such as engine shakes having an amplitude larger than the medium frequency vibrations such as engine idling vibrations.

The engine mount constructed according to the present embodiment is capable of actively changing the fluid pressure of the pressure-receiving chamber 63 by positively oscillating the oscillating metal member 94, which partially and directly defines the pressure receiving chamber 63, by means of the electromagnetic oscillator. For instance, the oscillating metal member 94 may positively be oscillated to offset or absorb the periodic fluid pressure change in the pressure receiving chamber due to the elastic deformation of the elastic body upon application of the vibrational load to be damped, so that the engine mount exhibits a low dynamic spring constant and a resultant high vibration isolating effect. Alternatively, the oscillating metal member 94 may positively be oscillated to positively induce the fluid pressure change in the pressure-receiving chamber which acts as an oscillating force to offset or reduce vibrations excited in the body of the vehicle. Described in detail, the oscillating metal member 94 is oscillated at a frequency and amplitude which correspond to those in the engine idling vibration, so that the engine mount can exhibit active vibration isolating effect owing to a positively induced low dynamic spring constant thereof, or owing to a positively induced oscillating force acting on the body of the vehicle to offset or cancel vibrations to be damped.

According to the engine mount of the present embodiment, the oscillating metal member 94 faces directly to the pressure receiving chamber 63, and is independent of the first and second orifice passages 70, 90. In this arrangement, the engine mount is capable of controlling the fluid pressure in the pressure-receiving chamber, even when a vibration whose frequency is higher than the frequency bands to which the first and second orifice passages 70, 90 are tuned and the first and second orifice passages 70, 90 are substantially closed due to increase in the resistance of the fluid flows therethrough. For instance, the engine mount of this embodiment can exhibit a high vibration isolating effect with respect to a high frequency vibration such as booming noise whose frequency is higher than the frequency of the engine idling vibration.

According to the engine mount of the present embodiment, the pressure-receiving chamber is partially defined by the flexible rubber plate 82 which is disposed in the open end of the second orifice passage 90 on the side of the pressure-receiving chamber. This arrangement is effective to eliminate or reduce a significant increase of the dynamic spring constant of the engine mount upon application of the high frequency vibration, which may be considered to be caused by a resonance of a mass-spring system consisting of the oscillating metal member 94 and the oscillating rubber support 96. Thus, the engine mount exhibits active vibration damping or isolating effect based on the oscillation of the oscillating metal member 94, with high stability and efficiency.

Figure 6A:
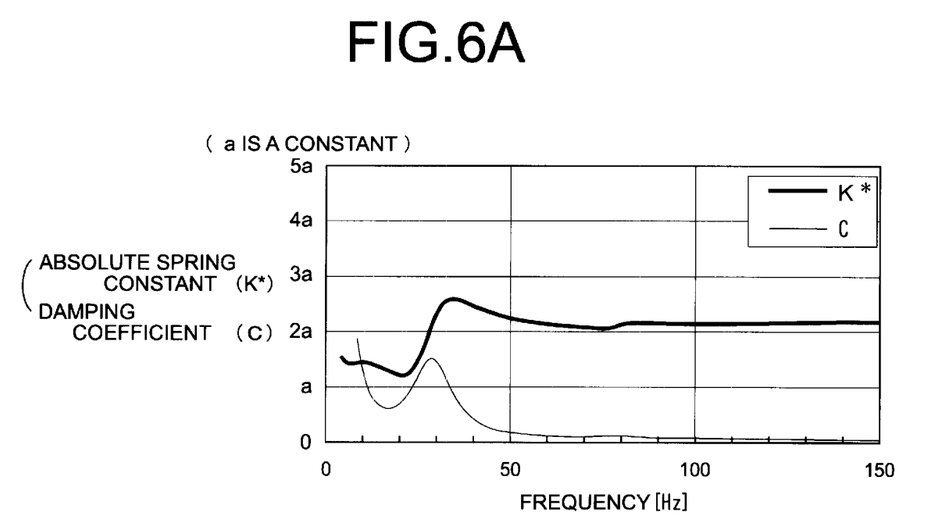
Figure 6B:
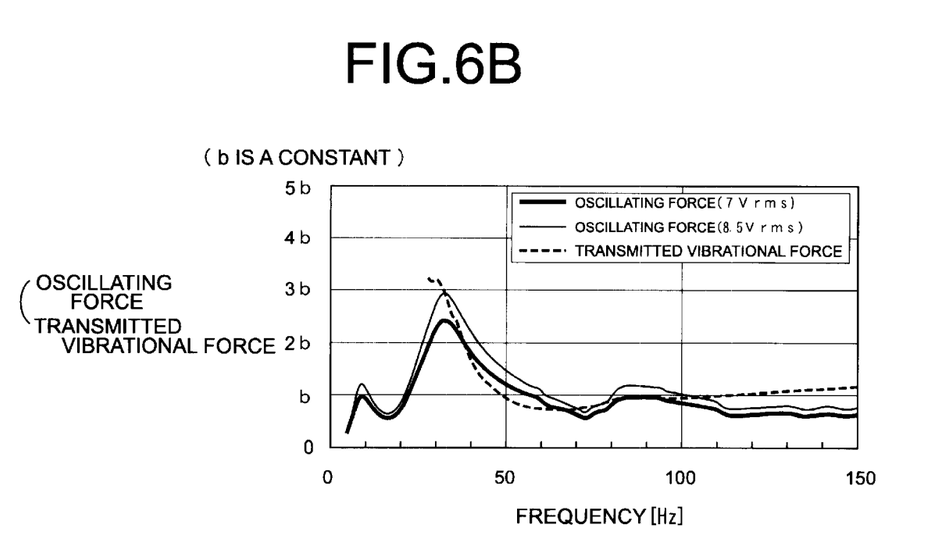
Figure 7:
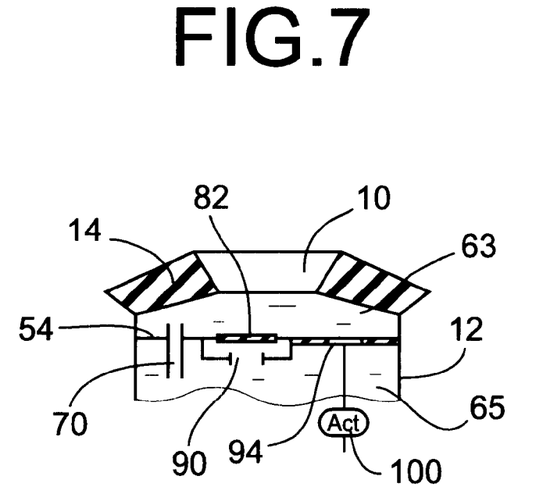
FIG. 7 is a view schematically showing a construction of the engine mount of FIG. 1.

Further, the oscillating metal member 94 is disposed within the central recess 60 of the partition member 54, which recess 60 is open in the axially lower surface of the partition member 54. When the oscillating metal member 94 is displaced in the axially upward direction relative to the partition member 54, the oscillating metal member 94 is brought into abutting contact with the bottom wall portion of the central recess 60, for thereby limiting an amount of displacement of the oscillating metal member 94 and an amount of elastic deformation of the oscillating rubber support 96. This makes it possible to prevent an excess amount of elastic deformation of the oscillating rubber support 96, resulting in excellent durability of the oscillating rubber support 96. THs The engine mount constructed according to the present embodiment was tested to measure the passive absolute spring constant when it was subjected to an vibrations applied between the first and second mounting members 10, 12 in the direction parallel to the center axis 16 of the mount. The measurements are indicated in the graph of FIG. 6(*a*) which shows a relationship between the absolute spring constant and the frequency of the applied vibrations. The engine mount of FIG. 1 was also tested to measure the generated oscillating force when the coil member 100 of the electromagnetic oscillating device is energized with AC voltage of 7 Vrms and 8.5 Vrms. The measurements are indicated in the graph of FIG. 6(*b*) together with the estimated value of vibrational force transmitted from the power unit to the vehicle body calculated based on an amount of displacement of the power unit relative to the body. FIG. 7 schematically shows the engine mount constructed according to the present embodiment.

Figure 8:
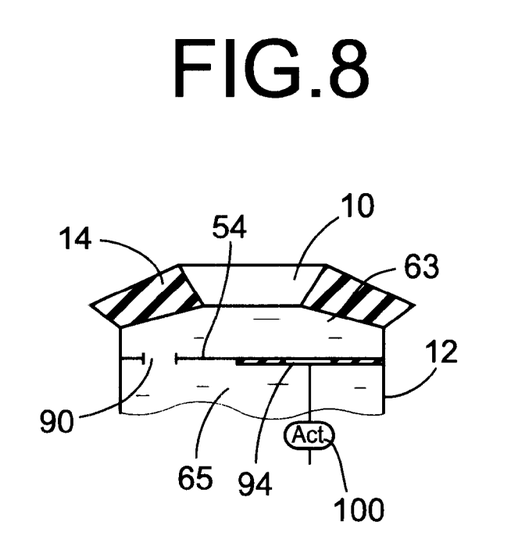
FIG. 8 is a view schematically showing a construction of an engine mount according to a comparative example 1.
Figure 9A:
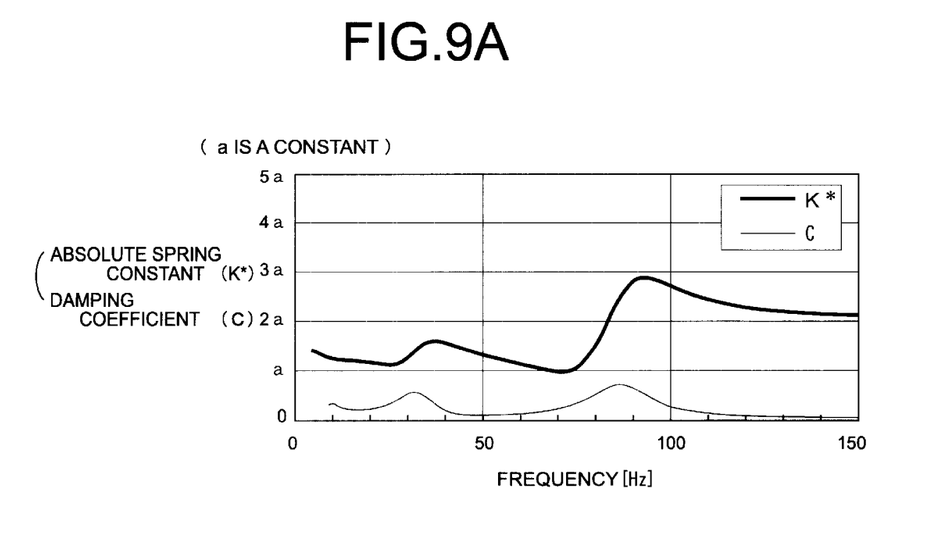
Figure 9B:
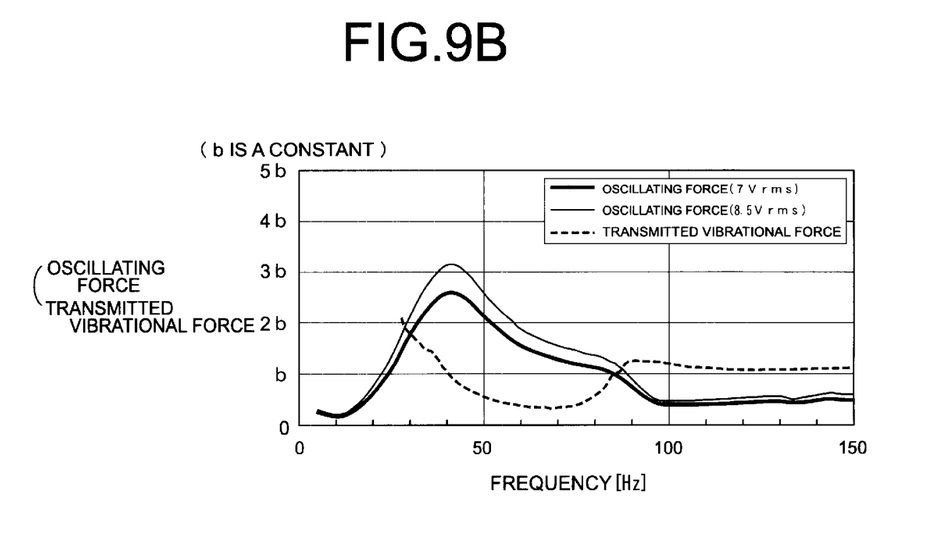

For comparison with the engine mount of FIG. 7, there was prepared an engine mount according to Comparative Example 1, wherein no rubber plate (82) is disposed in the open end of the second orifice passage, as schematically shown in FIG. 8. As is apparent from FIG. 8, an amount of flows of the fluid through the second orifice passage is not limited in the engine mount of the Comparative Example 1, due to the no use of the rubber plate (82), so that the first orifice passage (70) is substantially eliminated. The passive absolute spring constant and the generated oscillating force of the engine mount of the Comparative Example 1 were measured in the same manner. The measurements are indicated in the graph of FIG. 9(*a*) and FIG. 9(*b*).

Figure 10:
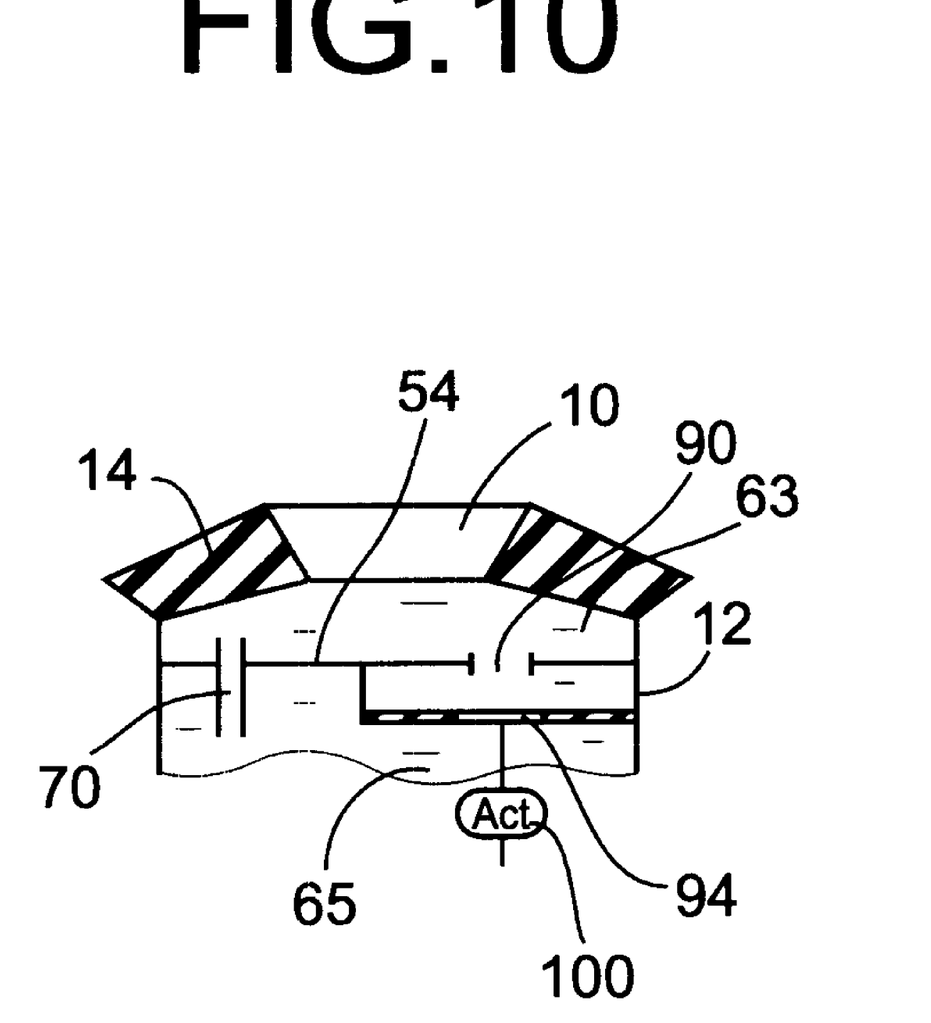
FIG. 10 is a view schematically showing a construction of an engine mount according to a comparative example 2.

Further, an engine mount according to a Comparative Example 2 was prepared, wherein the oscillating metal plate 94 is connected to the pressure-receiving chamber 63 via the second orifice passage 90 and no rubber plate (82) is disposed in the open end of the second orifice passage 90, as schematically shown in FIG. 10. The passive absolute spring constant and the generated oscillating force of the engine mount of the Comparative Example 2 were also measured in the same manner. The measurements are indicated in the graph of FIG. 11(*a*) and FIG. 11(*b*).

Figure 11A:
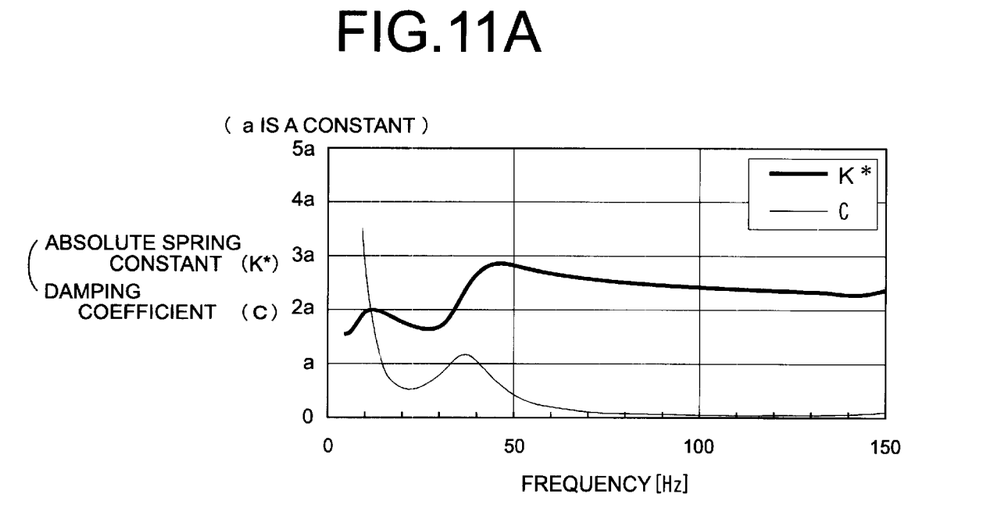
Figure 11B:
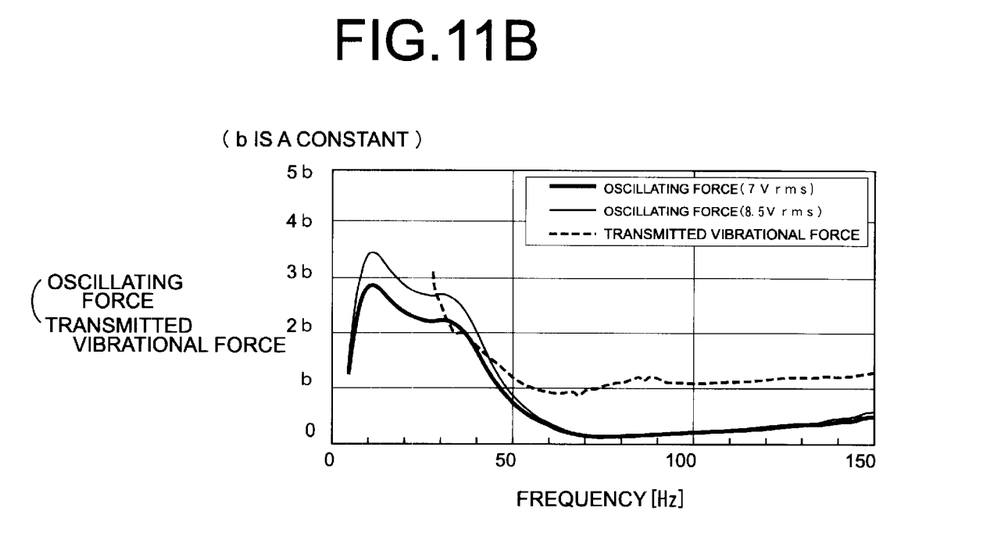

As is understood from the graph of FIG. 11(*a*), the engine mount according to the Comparative Example 2 dose not exhibit a high dynamic spring constant with respect to vibration in the high frequency band. However, the graph of FIG. 11(*b*) reveals that the engine mount of the Comparative Example 2 is incapable of generating a required oscillating force large enough to damp vibrations having frequencies larger than 30 Hz to which the second orifice passage 90 is tuned, since the fluid pressure change caused by the oscillation movement of the oscillating metal member 94 does not transmitted to the pressure receiving chamber 63 due to the malfunction or substantial closing of the second orifice passage 90. Thus, the engine mount of the Comparative Example 2 is insufficient in exhibiting a sufficient active damping effect with respect to vibrations over the wide frequency range.

On the other hand, the engine mount of the present embodiment makes it possible to avoid the problem of the significant increase of the dynamic spring constant upon application of the higher frequency vibrations, as shown in FIG. 6(*a*). In addition, the engine mount of the present embodiment is capable of generating a sufficiently large oscillating force to damp the medium and high frequency vibrations whose frequencies ranging from 30 Hz corresponding to the engine idling vibration to 150 Hz corresponding to the booming noise as shown in FIG. 6(*b*). Thus, the engine mount of the present embodiment is capable exhibiting an excellent active damping effect with respect to vibrations over the wide frequency range.

While the presently preferred embodiment of this invention has been described above in detail for the illustrative purpose only, it is to be understood that the present invention is not limited to the details of the illustrated embodiments, but may be otherwise embodied.

While the pressure receiving and equilibrium chamber 63, 65 are disposed on the axially opposite sides of the partition member 54 in the illustrated embodiment, the present invention is not limited to the illustrated embodiment, but may otherwise be embodied. For instance, a second equilibrium chamber is formed on the side of the first mounting member 10 such that the second equilibrium chamber is held in fluid communication with the pressure receiving chamber 63 through the first or the second orifice passages 70, 90, as disclosed in Japanese Laid-Open Publication No. JP-A-9-495413. Alternatively, an equilibrium chamber formed on the side of the first mounting member 10 may be employed, instead of the equilibrium chamber 65 which is formed on one of opposite side of the partition member 54 remote from the pressure-receiving chamber 63. Such as equilibrium chamber is employed together with a first and a second orifice passage which are formed between the equilibrium chamber and the pressure-receiving chamber 63. This arrangement needs not to form the orifice passage on the side of the partition member 54, resulting in an increased degree of freedom in determining the area and the configuration of the oscillating rubber plate.

In the illustrated embodiment, the oscillating metal member 94 is disposed within the central recess open in the axially lower surface of the partition member 54, and is faced or connected to the pressure receiving chamber 63 through the through holes 62 formed through the upper-bottom wall of the recess. It is possible to otherwise practice the present invention such that the oscillating metal member 94 is disposed within a through hole formed through the partition member 54 so that the oscillating metal member 94 is directly faced or connected to the pressure receiving chamber 63.

Further, the dynamic spring constant of the deformable elastic plate may be desirably changed so as to tune an optimum value of the dynamic spring constant of the engine mount in the frequency band higher than the frequency band to which the second orifice is tuned.

In addition, the present invention is applicable to a cylindrical elastic mount which is suitably used for a front engine front driving (FF) vehicles as disclosed in Japanese Laid-Open Publication No. JP-A-11-257414.

It is to be understood that the present invention may be embodied with various other changes, modifications, and improvement which may occur to those skilled in the art, without departing from the spirit and scope of the invention defined in the following claims.

What is claimed is:

1. A fluid-filled elastic engine mount comprising:
   a first and a second mounting member which are spaced apart from each other;
   an elastic body elastically connecting said first and second mounting members and partially defining a pressure-receiving chamber filled with a non-compressible fluid;
   a flexible diaphragm partially defining an equilibrium chamber filled with said non-compressible fluid, said flexible diaphragm being displaceable to permit a change in a volume of said equilibrium chamber;
   a movable oscillating plate partially defining said pressure-receiving chamber, said movable oscillating plate being oscillated by means of an oscillating device, for controlling pressure of said fluid in said pressure-receiving chamber;
   a first and a second orifice passage for effecting fluid communication between said pressure-receiving and equilibrium chambers, said first orifice passage being tuned to a low frequency band corresponding to an engine shake vibration, while said second orifice passage being tuned to a medium-frequency band corresponding to an engine idling vibration, said first and second orifice passages being formed independently of said movable oscillating plate and being disposed parallel to each other; and
   a deformable elastic plate being disposed in one of opposite opening of said second orifice passage on the side of said pressure-receiving chamber so that said deformable elastic plate closes said opening of said second orifice passage on the side of said pressure-receiving chamber.

2. A fluid-filled elastic engine mount according to claim 1, further comprising a deformation restricting member for restricting an amount of deformation of said deformable elastic plate.

3. A fluid-filled elastic engine mount according to claim 1, further comprising a deformation restricting member for restricting an amount of deformation of said movable oscillating plate.

4. A fluid-filled elastic engine mount according to claim 1, wherein said oscillating device comprises an electromagnetic actuator.

5. A fluid-filled elastic engine mount according to claim 1, further comprising a control device adapted to control said oscillating plate to be oscillated at a frequency corresponding to that of vibration to be damped.

6. A fluid-filled elastic engine mount according to claim 5, wherein said oscillating device comprises an electromagnetic actuator, and said control device controls an operation of said electromagnetic actuator based on an electric signal having a high degree of correlation with vibrations to be damped.

7. A fluid-filled elastic engine mount according to claim 1, wherein said second mounting member is a hollow cylindrical member, one of axially opposite open ends of said second mounting member being opposed to said first mounting member with a spacing therebetween and is fluid-tightly closed by said elastic body elastically connecting said first and second mounting member, said engine mount further comprising a partition member fixedly accommodated within said second mounting member such that said partition member extends in a radial direction perpendicular to an axial direction thereof, and such that said pressure receiving chamber partially defined by said elastic body is located on one of axially opposite sides of said partition member and said equilibrium chamber partially defined by said flexible diaphragm is located on the other side of said partition member, said partition member including a through hole formed through a center portion thereof for accommodating therein said movable oscillating plate partially defining said pressure-receiving chamber, and said first and second orifice passages formed in an outer circumferential portion thereof, said oscillating device being supported by said second mounting member on the side of the other open end portion of said second mounting member which is remote from said first mounting member.

8. A fluid-filled elastic engine mount according to claim 1, wherein said movable oscillating plate is directly open to said pressure-receiving chamber.

* * * * *